(12) United States Patent
Lavoie

(10) Patent No.: US 8,747,494 B2
(45) Date of Patent: Jun. 10, 2014

(54) AUTO-COMBUSTIBLE TORCH

(76) Inventor: Jean-Pierre Lavoie, Wickham (CA)

(*) Notice: Subject to any disclaimer, the term of this patent is extended or adjusted under 35 U.S.C. 154(b) by 29 days.

(21) Appl. No.: 13/506,536

(22) Filed: Apr. 26, 2012

(65) Prior Publication Data

US 2012/0279116 A1 Nov. 8, 2012

Related U.S. Application Data

(60) Provisional application No. 61/457,597, filed on Apr. 28, 2011.

(51) Int. Cl.
*C10L 9/08* (2006.01)
*C10L 11/06* (2006.01)

(52) U.S. Cl.
USPC .................. 44/522; 44/520; 44/521; 44/532; 44/533; 44/535; 44/605; 44/606; 44/607

(58) Field of Classification Search
USPC .......... 44/520–522, 533, 535, 606–607, 532, 44/605
See application file for complete search history.

(56) References Cited

U.S. PATENT DOCUMENTS

| 4,758,245 | A | * | 7/1988 | Langston | 44/634 |
| 5,505,240 | A | * | 4/1996 | Horne et al. | 144/329 |
| 5,833,353 | A | * | 11/1998 | Smith | 362/180 |
| 6,678,994 | B2 | * | 1/2004 | Topp | 43/124 |
| 2011/0126452 | A1 | * | 6/2011 | Blackmore | 44/522 |

FOREIGN PATENT DOCUMENTS

DE 202004018192 U1 * 6/2005
FR 2808665 A1 * 11/2001

OTHER PUBLICATIONS

Firewood Regulations National Plant Board (2010) W. N. Dixon and A Gibbs.*
Canadian Food Inspection Agency P1-07 (Jan. 12, 2009).*
Machine Translation FR2808665A1 Claims and Description (Nov. 2001).*
Machine Translations DE202004108192U1 (Jun. 2005).*

* cited by examiner

*Primary Examiner* — Pamela H Weiss

(57) ABSTRACT

The present invention concerns an auto-combustible log comprising at least one air intake connected to a chimney wherein the log is made of wood, wood particle or wood residues wherein the wood, wood particles or wood residues have been treated to destroy any invasive pests, such as insects and fungi.

13 Claims, 2 Drawing Sheets

AUTO-COMBUSTIBLE TORCH

RELATED APPLICATION

The present application claims the benefit of provisional application 61/457,597, filed Apr. 28, 2011.

FIELD OF THE INVENTION

The present invention relates to an auto-combustible wood torch.

SUMMARY OF THE INVENTION

The present invention concerns an auto-combustible log comprising at least one air intake connected to a chimney wherein the log is made of wood, wood particle or wood residues wherein the wood, wood particles or wood residues have been treated to destroy any invasive pests, such as insects and fungi.

BACKGROUND ART

Wood torches are being used as party lighting and portable cooking unit. The Swedish logs being the most common of these wood torches are made by cutting vertically into a log with a chainsaw a various intervals, depending on the diameter of the log. German Patent Application DE19527707C1 discloses such logs.

German Patent Application DE202004018192U1 discloses a natural wood torch made of a wood log comprising a centre hole and a basal side hole filled with an inflammable material within a protective metal sleeve to allow even oxygen supply by the side hole and prevent uneven and uncontrolled burning through the side hole.

Similarly, DE202004006630U1 discloses a wood torch with a chimney effect comprises a base formed of a wooden stem section, branches, old beams, etc., of any length having a vertical opening to give a chimney effect. The chimney opening leads into a lower conical opening in the base, which is introduced either from below or from the side.

DE 202009000411U1 discloses a torch from wood or wood substitute characterized by several elongated woods segments, combined into a collar, whereby the collar exhibits at least one central chimney.

JP2006194568 (A) discloses a timber log cooking stove comprising a through hole that acts as the chimney wherein the fire power is adjusted by varying the oxygen supply.

However, a drawback of the wood torches as they are known is that they cannot be transported from one region to another because of the risk of dissemination of dangerous invasive insects and diseases which can be found in natural logs, wood particles and wood residues.

It is a purpose of the present invention to provide wood torches wherein the wood logs, wood particles or wood residues have been treated to destroy any invasive insects or fungi so that they can be transported from one region to another without the risk of spreading invasive insects or diseases.

DETAILED DESCRIPTION

Figure 1:
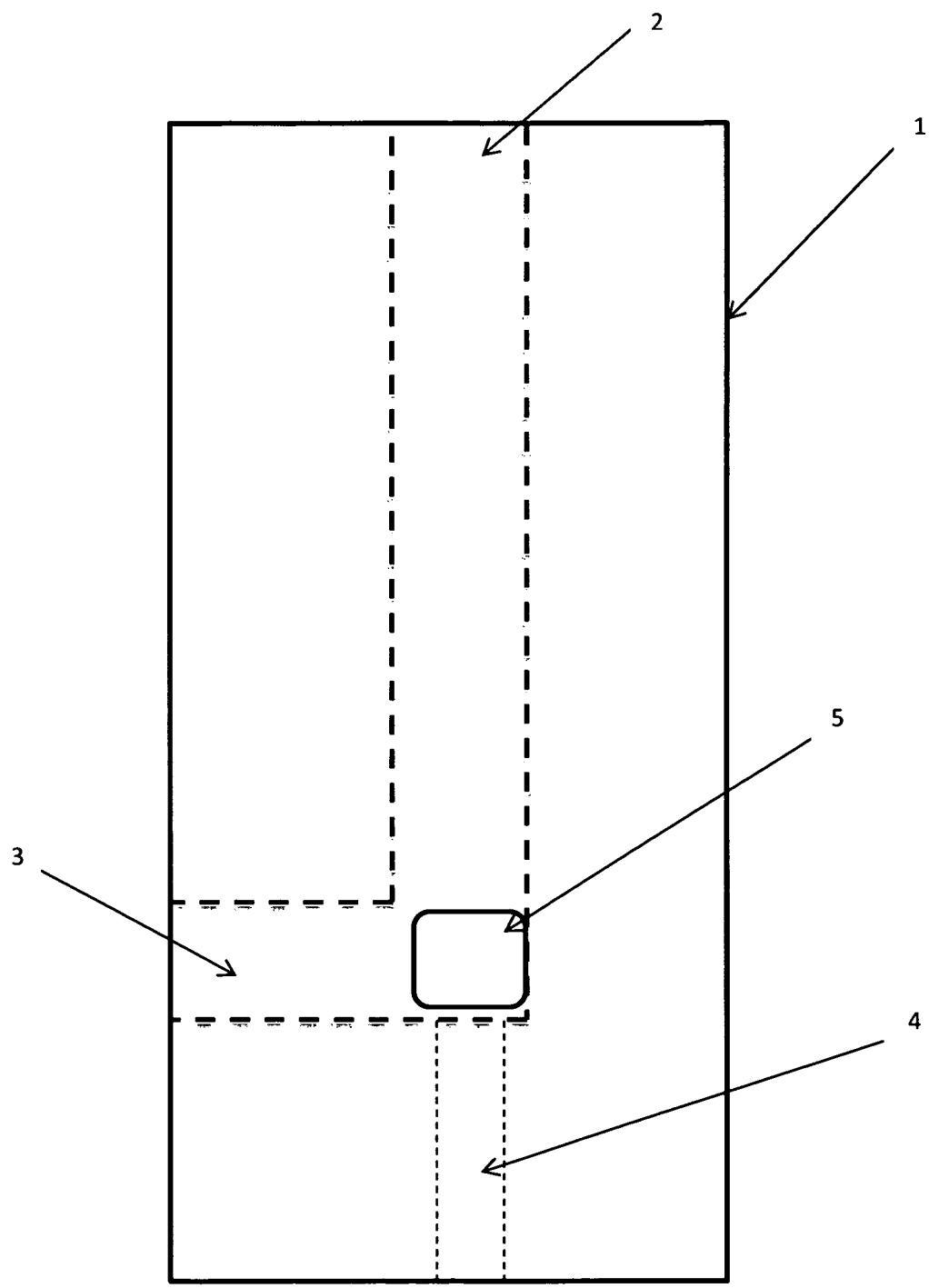
FIG. 1 represents a wood torch 1 comprising from a vertical chimney 2 to which an air intake 3 is connected wherein an ignition component 5 is inserted. A hole 4 has been drilled prior to the drying of the torch.
Figure 2:
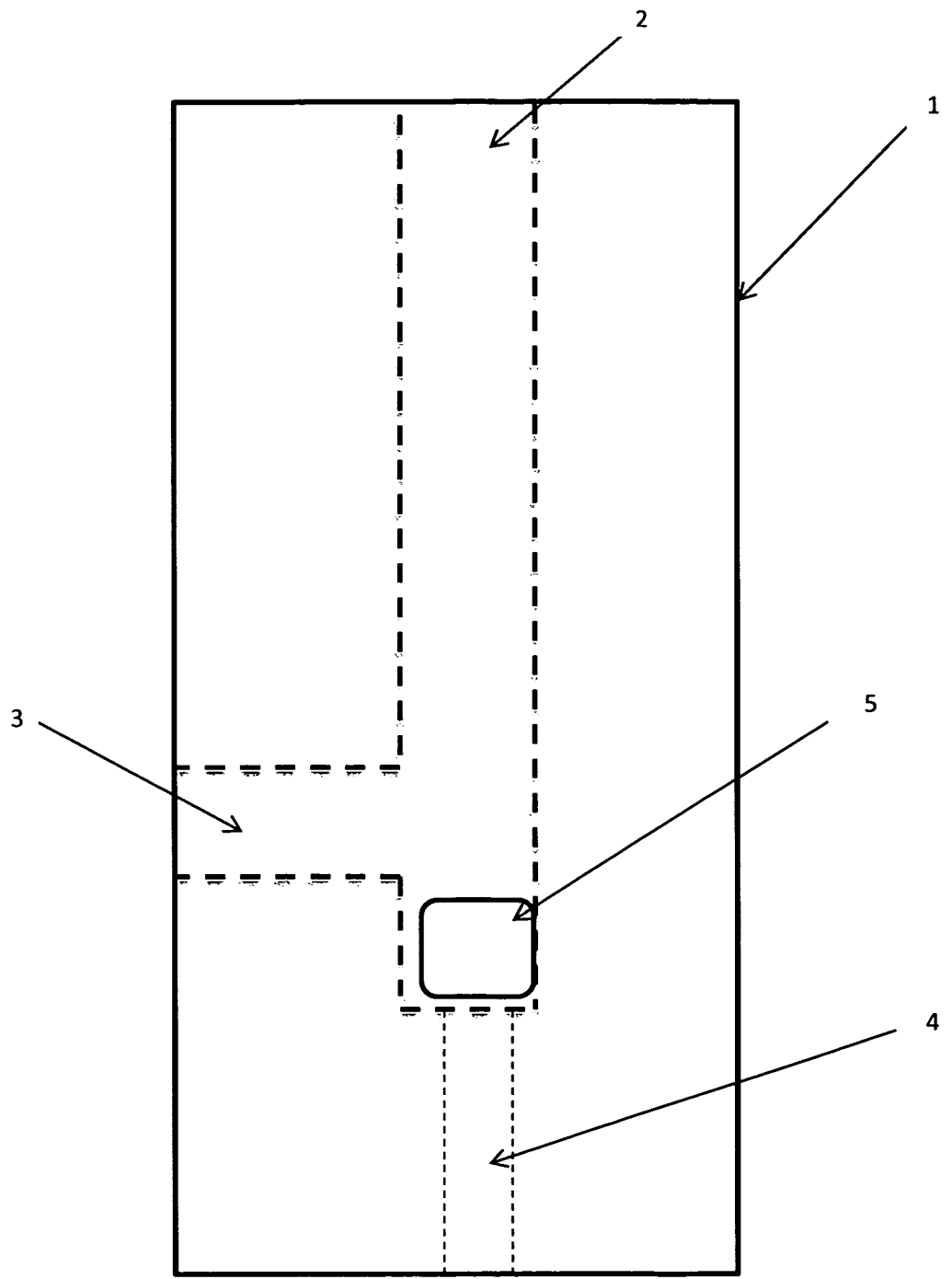
FIG. 2 represents a wood torch 1 comprising from a vertical chimney 2 to which an air intake 3 is connected wherein an ignition component 5 is inserted. A hole 4 has been drilled prior to the drying of the torch.

The present invention concerns an auto-combustible wood torch wherein the wood torch is made of natural log, wood particle, wood residues or densified recycled wood products from recycled wood products, cardboard or paper.

Preferably, the wood torch is made of a natural wood logs such as *Betula Papyrifera*, optionally with its bark.

More preferably, the natural wood log is a log of *Betula Papyrifera*, also known as paper birch, American white birch and canoe birch.

The wood torch has a length of about 6" to about 48", preferably 12" and a diameter of about 4" to about 12". Preferably, the ratio length to diameter is about 3/1.

The wood torch is treated, before or after its transformation, to destroy any invasive insects or fungi so that they can be transported from one region to another without the risk of spreading invasive insects or diseases. The treatment can be, for example, a heat treatment or a chemical treatment.

Preferably, the wood torch is heat-treated at a temperature of from about 60° C. to about 80° C. for 75 minutes to 48 h. The heat-treatment can be performed under dry atmosphere or humid atmosphere.

In an alternative embodiment, the wood torch is treated by fumigation with, for example, methylbromide.

The wood torch comprises at least one air intake connected to at least one chimney. The air intake and the chimney are made by drilling a hole in the wood torch and are connected to each other.

The air intake can be connected to the chimney at an angle of 90° to 135°. Preferably, the angle is of 90°.

In a preferred embodiment of the invention, a hole of ¼" to ¾" in diameter is drilled from the bottom of the log so that it reaches the main chimney before treating the log by heat treatment. In a preferred embodiment, the hole has a diameter of ⅜". In an alternate embodiment, the hole has a diameter of ½". After the log has been treated, the hole is filled with the wood removed so that there is no opening at the base of the log. However, it is acceptable if the hole is not perfectly sealed, as long as most of the opening is filled. This allows for better drying of the log when it is heat treated while ensuring that all invasive insects or fungi are destroyed. Furthermore, the duration of the heat treatment is reduced and it renders the drying process more efficient. For example, Chimney The present wood torches have from 1 to 20 main chimney having a diameter of from about ½" to about 7½" to which are connected 1 to 24 secondary chimneys having a diameter of from about ¼" to about 2½'. The main chimney is shorter in length than the wood torch so that the bottom of the torch does not comprise any opening.

Preferably, the present wood torches have only one main chimney having from about ¼" to about 2½" in diameter.

Air Intake

The present wood torches have from 1 to 50 air intakes having a diameter of about 3/16" to about 5".

Preferably, the wood torches have only one air intake.

The air intake can be connected to the chimney at an angle of 90° to 135°. Preferably, the angle is of 90°.

Ignition Component

The present auto-combustible wood torch can comprises an ignition component. The ignition component can be any combustible that will result in the combustion of the wood torch after being ignited. For example, the ignition component can be fuel such as kerosene or a candle.

Preferably, the ignition component is a candle made of paraffin and wood residues. More preferably, the component system is a candle made of paraffin and wood residues that, upon burning, free the air intake to allow combustion of the wood torch.

The candle will have a diameter of at most the diameter of the chimney.

EXAMPLES

Example 1

Different wood logs were prepared, and the drying time to destroy any invasive insects or fungi varied depending on the length of the log and the presence of a hole a the bottom, as described in Table 1.

| Length | Diameter | Hole at the bottom | Temperature | Drying time Dry atmosphere | Wet atomosphere |
|---|---|---|---|---|---|
| 12" | 12" | N | 70° C. | 39 h 1 min. | 34 h 31 min. |
| 12" | 6" | N | 70° C. | 13 h 38 min. | 9 h 8 min. |
| 12" | 4" | N | 67.2° C. | 13 h 38 min. | 9 h 8 min. |
| 12" | 12" | N | 64.4° C. | 72 h 8 min. | 67 h 38 min. |
| 12" | 12" | Y | 70° C. | 26 h 42 min. | 21 h 12 min. |
| 12" | 8" | Y | 70° C. | 13 h 32 min. | 9 h 12 min. |

As can be seen in Table 1, the presence of an opening over the whole length of the log significantly reduces the drying time required to destroy any invasive insects or fungi and thus render the drying process more efficient.

Example 2

A wood log of *Betula Papyrifera* having a diameter of about 10" is cut at a length of 12". A main chimney of 2" in diameter and 10½" in length is drilled from one end towards the other end, but without reaching the bottom of the log. An air intake of a diameter of 2" is drilled at a 90° angle with the main chimney is drilled at 1½" from the base of the log so that it is connected with the lower end of the main chimney. A hole of ½" in diameter and a length of 1½" is drilled from the bottom of the log so that it reaches the main chimney and a wood rod is removed from the log. The wood log is dried at a temperature of 70° C. for 26 h 42 min., after which the bottom hole is filled with the wood rod removed prior to the drying.

Comparative Example 1

A wood log of *Betula Papyrifera* having a diameter of about 12" is cut at a length of 12". A main chimney of 2" in diameter and 10½" in length is drilled from one end towards the other end, but without reaching the bottom of the log. An air intake of a diameter of 2" is drilled at a 90° angle with the main chimney is drilled at 1½" from the base of the log so that it is connected with the lower end of the main chimney. The wood log is dried in an oven at a temperature of 70° C. for 26 h 42 min.

Combustion Results

The wood logs of example 2 and comparative example 1 were ignited with an ignition system made of wax and wood residues. The combustion of example 2 was even and more intense whereas the combustion of comparative example 1 was uneven and produced more smoke than the combustion of example 1.

Therefore, drilling a hole at the bottom of the log prior to the drying, which is filled after the drying, results in improved combustion performances. Furthermore, the drying time is shorter when such an aperture is made compared to the drying time required to obtain equivalent burning performance in a log without such an aperture. Also, when a hole is drilled through the whole length of the log before the heat treatment, any invasive insects or fungi present in the log are destroyed and it is now possible to transport the logs from one region to another without the risk of spreading invasive insects or diseases.

The invention claimed is:

1. An auto-combustible torch made of a combustible component having the shape of a log having a diameter of 4" to 16" and a length of 6" to 48" wherein at least one main vertical chimney having a diameter of ½" to 4" and a length of 10" to 22" is connected to at least one air intake having a diameter of ¼" to 2½", at an angle of from 90° to 135°, wherein the torch has been treated to destroy any invasive insects or fungi by heat treatment at a temperature of from 60° C. to 80° C. for a time of 75 minutes to 96 h, wherein the combustible component is solid wood, wood particles, densified wood products or recycled wood products wherein a hole having a diameter of ¼" to ¾" is drilled from the bottom of the log so that it connects with the main vertical chimney prior to the treatment of the torch and is filled after the treatment of the torch.

2. The auto-combustible torch as defined in claim 1 wherein the solid wood is *Betula papyrifera*.

3. The auto-combustible torch as defined in claim 1 further comprising an ignition component is a fuel from the group consisting of kerosene and a candle.

4. The auto-combustible torch as defined in claim 3 wherein the candle is made of paraffin and wood residues.

5. An auto-combustible torch made of a log of solid wood having a diameter of 12" and a length of 12", having one main vertical chimney having a diameter of 2¼" and a length of 10½" connected to one air intake having a diameter of 2" at an angle of 90°, wherein the log has been treated to destroy any invasive insects or fungi by a heat treatment at a temperature of 70° C. for 21 h to 27 h and wherein a hole of ½" in diameter is drilled from the bottom of the log so that it connects with the main vertical chimney prior to the heat treatment of the torch and is filled after the heat treatment of the torch.

6. The auto-combustible torch as defined in claim 1 wherein the diameter of the log is 12".

7. The auto-combustible torch as defined in claim 1 wherein the length of the log is 16".

8. The auto-combustible torch as defined in claim 1 wherein the length of the log is 12".

9. The auto-combustible torch as defined in claim 1 wherein the diameter of the chimney is 2¼".

10. The auto-combustible torch as defined in claim 1 wherein the length of the chimney is 10½".

11. The auto-combustible torch as defined in claim 1 wherein the diameter of the air intake is 2".

12. The auto-combustible torch as defined in claim 1 wherein the angle of the air intake is 90°.

13. The auto-combustible torch as defined in claim 1 wherein the combustible component is solid wood.

\* \* \* \* \*